United States Patent
Kitamorn et al.

(10) Patent No.: US 6,728,668 B1
(45) Date of Patent: Apr. 27, 2004

(54) METHOD AND APPARATUS FOR SIMULATED ERROR INJECTION FOR PROCESSOR DECONFIGURATION DESIGN VERIFICATION

(75) Inventors: Alongkron Kitamorn, Austin, TX (US); Charles Andrew McLaughlin, Round Rock, TX (US); Camvan Thi Nguyen, Austin, TX (US); Jayeshkumar M. Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/434,876

(22) Filed: Nov. 4, 1999

(51) Int. Cl.[7] .................................................. G06F 9/44
(52) U.S. Cl. .......................... 703/22; 703/27; 714/14; 714/25
(58) Field of Search ............................ 703/14, 17, 20, 703/27, 22; 716/16, 17; 714/30, 10, 25; 717/134, 135, 145; 713/1

(56) References Cited

U.S. PATENT DOCUMENTS

| | | | | |
|---|---|---|---|---|
| 5,438,528 A | * | 8/1995 | Emerson et al. ............. 364/580 |
| 5,649,090 A | * | 7/1997 | Edwards et al. ......... 395/182.08 |
| 5,675,803 A | * | 10/1997 | Preisler et al. .............. 395/704 |
| 5,764,883 A | * | 6/1998 | Satterfield et al. ...... 395/183.14 |
| 6,018,812 A | * | 1/2000 | Deyst, Jr. et al. ............ 714/724 |
| 6,122,756 A | * | 9/2000 | Baxter et al. .................. 714/30 |
| 6,182,248 B1 | * | 1/2001 | Armstrong et al. ........... 714/43 |
| 6,233,680 B1 | * | 5/2001 | Bossen et al. .................. 713/1 |
| 6,247,079 B1 | * | 6/2001 | Papa et al. ................... 710/103 |
| 6,304,984 B1 | * | 10/2001 | Neal et al. ..................... 714/57 |
| 6,345,369 B1 | * | 2/2002 | Kitamorn et al. ............. 714/14 |
| 6,430,586 B1 | * | 8/2002 | Williams .................... 708/250 |
| 6,457,147 B1 | * | 9/2002 | Williams .................... 714/703 |
| 6,487,208 B1 | * | 11/2002 | Chirashnya et al. ........ 370/400 |
| 6,502,212 B1 | * | 12/2002 | Coyle et al. .................. 714/43 |

* cited by examiner

*Primary Examiner*—Samuel Broda
*Assistant Examiner*—T. Phan
(74) *Attorney, Agent, or Firm*—Duke W. Yee; Mark E. McBurney; Wayne P. Bailey

(57) ABSTRACT

A method and apparatus for simulated error injection for processor deconfiguration design verification is provided. A simulated error condition request is received from a user through software, such as the operating system executing in the multiprocessor data processing system. In response to the requested simulated error condition, an error condition is injected into a processor of the multiprocessor data processing system via instruction execution. In response to the detection of the error condition and execution of error-path code, a processor is deconfigured. The error condition may be injected by executing an instruction to set an error condition bit in an error condition register.

22 Claims, 3 Drawing Sheets

FIG. 3A

ERROR CONDITION REGISTER 300

| L2 CACHE ERROR (BIT 0) | ARITHMETIC OVERFLOW (BIT 1) | ERROR CONDITION BIT 2 | ERROR CONDITION BIT 3 | ERROR CONDITION BIT 4 | ERROR CONDITION BIT 5 | ERROR CONDITION BIT 6 | ERROR CONDITION BIT 7 |
|---|---|---|---|---|---|---|---|
| 302 | 304 | 306 | 308 | 310 | 312 | 314 | 316 |

FIG. 3B

ERROR CONDITION MASK REGISTER 350

| L2 CACHE ERROR MASK (BIT 0) | ARITHMETIC OVERFLOW MASK (BIT 1) | ERROR CONDITION MASK BIT 2 | ERROR CONDITION MASK BIT 3 | ERROR CONDITION MASK BIT 4 | ERROR CONDITION MASK BIT 5 | ERROR CONDITION MASK BIT 6 | ERROR CONDITION MASK BIT 7 |
|---|---|---|---|---|---|---|---|
| 352 | 354 | 356 | 358 | 360 | 362 | 364 | 366 |

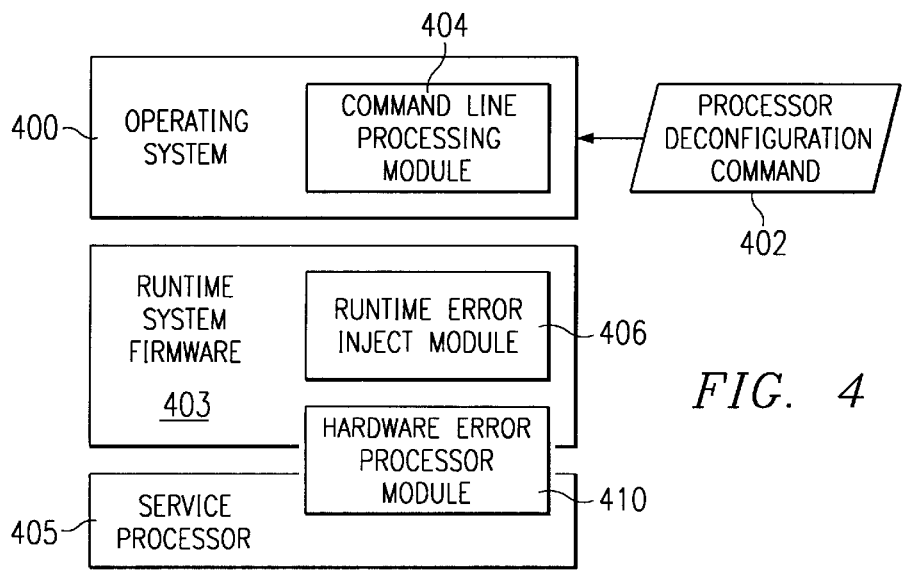

FIG. 4

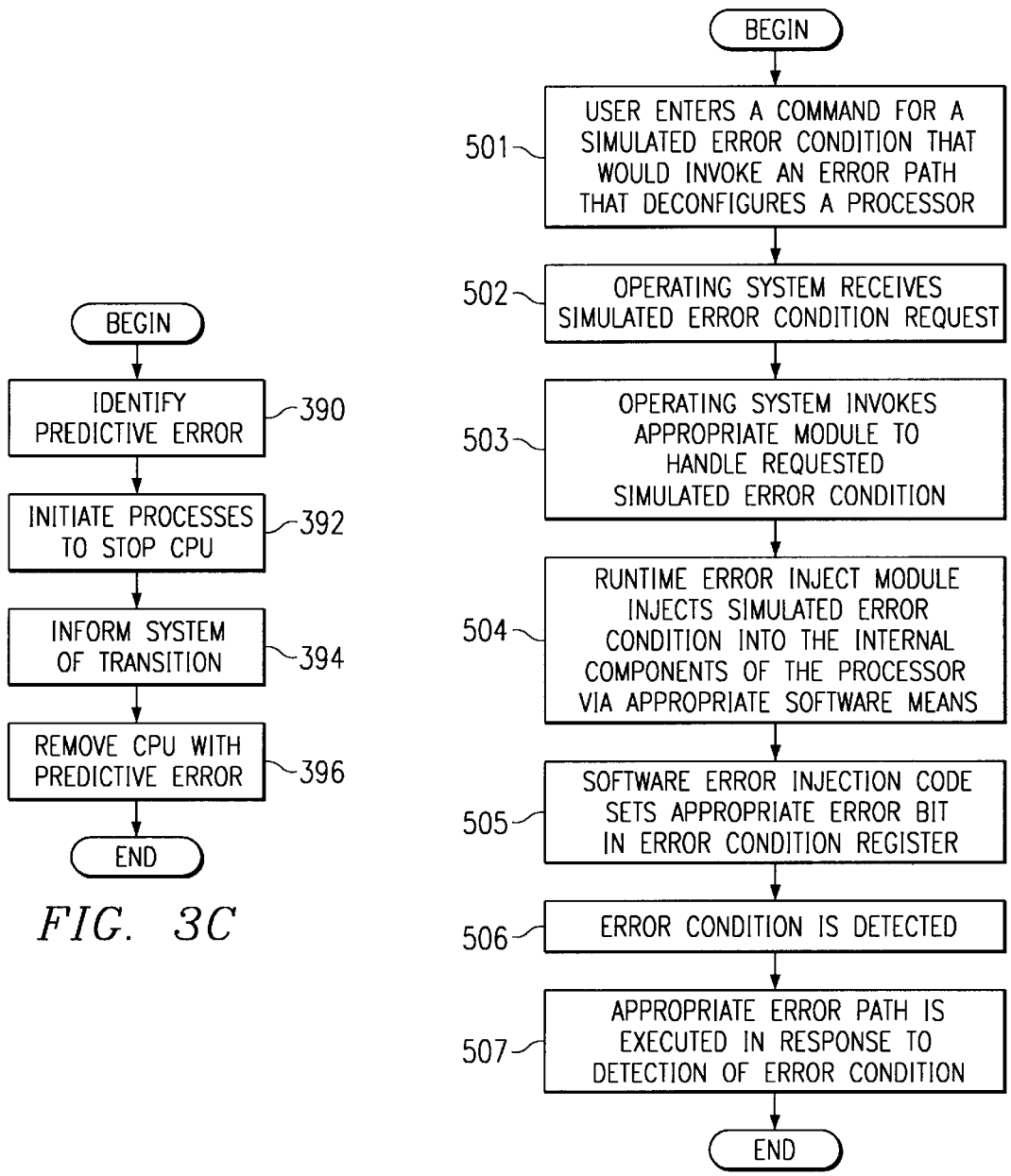

METHOD AND APPARATUS FOR SIMULATED ERROR INJECTION FOR PROCESSOR DECONFIGURATION DESIGN VERIFICATION

CROSS-REFERENCE TO RELATED APPLICATIONS

The present invention is related to the following applications entitled "Method and System for Boot-Time Deconfiguration of a Processor in a Symmetrical Multi-Processor System," U.S. application Ser. No. 09/165,952, filed on Oct. 2, 1998, now U.S. Pat. No. 6,233,680, and "Method and Apparatus for Run-Time Deconfiguration of a Processor in a Symmetrical Multi-Processing System", U.S. application Ser. No. 09/434,767, filed on Nov. 4, 1999 now U.S. Pat. No. 6,516,429 which are hereby incorporated by reference.

BACKGROUND OF THE INVENTION

1. Technical Field

The present invention relates generally to an improved data processing system. Still more particularly, the present invention provides a method and apparatus for testing fault tolerant processing within a symmetrical multiprocessing system.

2. Description of Related Art

With the need for faster data processing systems, symmetrical multiprocessing (SMP) systems are being used more often. SMP is a computer architecture in which multiple processors share the same memory containing one copy of the operating system, one copy of any applications that are in use, and one copy of the data. These systems reduce transaction time because the operating system divides the workload into tasks assigned to available processors.

Like other data processing systems, SMP systems may experience failures. Some of these failures are so-called hard or solid errors, from which no recovery is possible. A hard error, in general, causes a system failure. Thereafter, the device that has caused the hard error is replaced. On the other hand, a number of failures are repeatable or so-called soft errors, which occur intermittently and randomly. In contrast to a hard error, a soft error, with proper recovery and retry design, can be recovered and prevent a system from failing. These soft errors are often localized to a particular processor within the SMP system. The SMP system usually has capabilities to detect and recover from certain hardware-related errors. However, given the increasing complexity of current data processing systems, especially multiprocessor systems, the permutations of possible errors in a failing system can be quite large. Thus, the design and test of system hardware, firmware and software for detecting and recovering from these errors is similarly complex.

Another layer of complexity is added by the fact that multiple hardware and software vendors collaborate in designing system components, and the procedures for testing the fault tolerance among the various hardware, firmware, and software components could be more efficient with the proper testing utilities.

Consequently, it would be advantageous to have a method and apparatus for simulating errors in a processor within a multiprocessor system in order to test its system design and fault-tolerant recovery capabilities.

SUMMARY OF THE INVENTION

A method and apparatus for simulated error injection for processor deconfiguration design verification is provided. A simulated error condition request is received from a user through software, such as the operating system executing in the multiprocessor data processing system. In response to the requested simulated error condition, an error condition is injected into a processor of the multiprocessor data processing system via instruction execution. In response to the detection of the error condition and execution of error-path code, a processor is deconfigured. The error condition may be injected by executing instructions to set an error condition bit in an error condition register.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A is a diagram depicting a standard error condition register that may be found within a processor;

FIG. 3B is an illustration of a standard error condition mask register within a processor;

FIG. 3C is a flowchart of a process for runtime deconfiguration of a processor in a multiprocessor system;

FIG. 4 is a block diagram depicting some of the software modules involved in performing a processor deconfiguration through a simulated error condition in accordance with a preferred embodiment of the present invention; and FIG. 5 is a flowchart depicting a process in which an operating system deconfigures a processor in a multiprocessor system through a simulated error condition in accordance with a preferred embodiment of the present invention.

DETAILED DESCRIPTION OF THE PREFERRED EMBODIMENT

Figure 1:
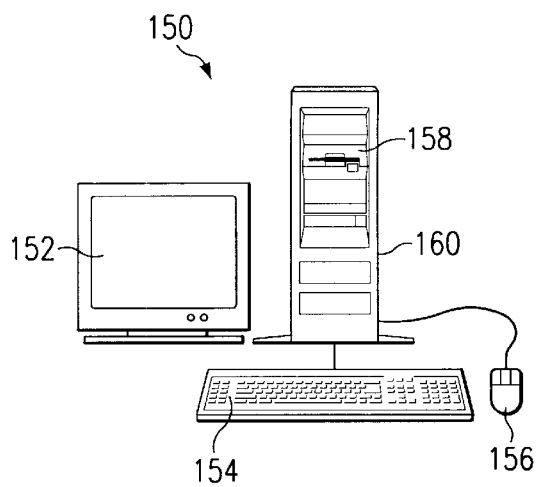
FIG. 1 is a pictorial representation depicting a data processing system in which the present invention may be implemented.

In one aspect, the present invention provides functionality for testing a multiprocessor system. The development of any system usually passes through a design, build, and test phase. Once the hardware, firmware and operating system have been designed and built, the fault tolerant capabilities of the system should be tested. When an actual hardware error is detected, the system responds by executing firmware and software in an attempt to recover from the error. The execution paths through the firmware and software code may be referred to as "error paths". In order to test the system robustly, every error path through the error detection and reconfiguration code in the system firmware and software should be tested because each error path performs some manner of unique processing in response to a particular runtime environment containing the error. Hence, each error path can only be tested by generating the particular error condition that invokes the particular error path.

More specifically, the present invention provides a method, apparatus, and computer implemented instructions for testing the error path processing for runtime deconfiguration of a processor in a multiprocessor system. In this manner, the present invention involves providing test functionality through simulated error conditions for the fault-tolerance functionality provided by United States Patent Application, entitled "Method and Apparatus for Run-Time Deconfiguration of a Processor in a Symmetrical Multi-Processing System," attorney docket AT9-99-537, Ser. No. 09/434,767, filed on Nov. 4, 1999.

As explained in more detail in the above noted patent application, the multiprocessor system may identify a degradation of a processor in the system through the detection of intermittent errors and may deconfigure the processor dynamically from the system configuration. As used herein, deconfiguring a processor is a process used to stop and logically remove the processor from the system. Dynamic deconfiguration means that this process is performed during system runtime. Processor deconfiguration testing may be used for a variety of purposes, such as, testing the recovery from intermittent errors or failures in order to prevent a hard error or failure in the system.

The present invention provides the ability to simulate an error condition such that the system attempts a runtime deconfiguration of a processor in a multiprocessor system. The user, e.g. a test engineer, may specify a type of simulated error condition to be injected into a processor through software. The error analysis and error path processing provided by the runtime system firmware or the service processor, i.e. the system functionality that is being tested, then identifies the error condition and executes along the appropriate error path. A CPU having this type of error is identified as one to be deconfigured, and the test engineer may quickly evaluate whether the error path executed properly.

In the prior art, this type of testing involves physically modifying the processor or the hardware to generate an error that will be detected by the processor and cause the invocation of the error path. Usually, the hardware is physically modified by connecting test equipment that generates faulty signals or modifies the system signals, or the hardware may be made physically defective in some manner.

Using the present invention, the test engineer may quickly and repetitively simulate a variety of error conditions in order to invoke a variety of error paths. The testing procedure is then accomplished much more quickly and efficiently.

With reference now to FIG. 1, a pictorial representation depicts a typical data processing system in which the present invention may be implemented. A computer 150 is depicted, which includes a system unit 160, a video display terminal 152, a keyboard 154, storage devices 158, which may include floppy drives and other types of permanent and removable storage media, and mouse 156. Additional input devices may be included with computer 150. Computer 150 can be implemented using any suitable computer, for example, an IBM RISC/System 6000 system, a product of International Business Machines Corporation in Armonk, New York. Although the depicted representation shows a server-type computer, other embodiments of the present invention may be implemented in other types of data processing systems, such as workstations, network computers, Web-based television set-top boxes, Internet appliances, etc. Computer 150 also preferably includes a graphical user interface that may be implemented by means of system software residing in computer readable media in operation within computer 150.

FIG. 1 is intended as an example and not as an architectural limitation for the present invention.

Figure 2:
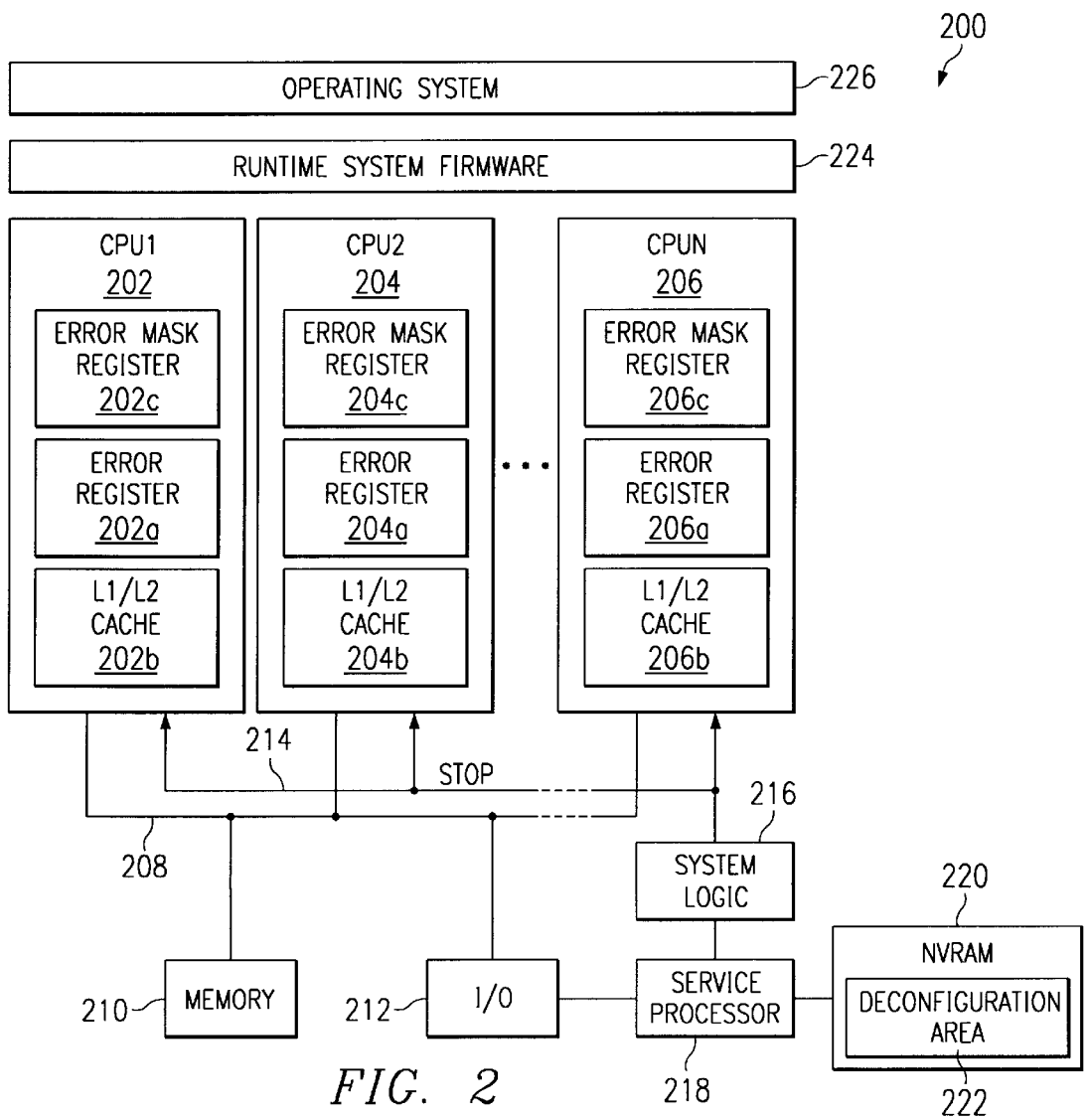
FIG. 2 is a block diagram depicting internal components of a multiprocessor data processing system which may implement the present invention.

With reference now to FIG. 2, a block diagram depicts internal components of a multiprocessor data processing system which may implement the present invention. Those of ordinary skill in the art will appreciate that the hardware in FIG. 2 may vary depending on the system implementation. For example, the system may have more processors, and other devices may be used in addition to or in place of the hardware depicted in FIG. 2. The depicted examples are not meant to imply architectural limitations with respect to the present invention.

System 200 includes central processing units (CPUs) 202, 204, and 206. Although only three CPUs are illustrated in this example, other numbers of CPUs may be used with the present invention. Error registers 202a, 204a, and 206a are located in CPUs 202, 204, and 206, respectively. These registers are used to provide an indication of an error in a processor based on a detection of the error in error logic within the processor. In addition to other registers, processors 202, 204, and 206 contain error condition mask registers 202c, 204c, and 206c for controlling reportable error conditions within the processor during execution. Processors 202, 204, and 206 may be any suitable processor, such as a processor selected from the PowerPC family of processors, also a product of IBM.

Bus 208 provides CPUs 202, 204, and 206 a connection to system memory 210 and input/output (I/O) 212. L1/L2 caches 202b, 204b, and 206b contain data used by the CPUs 202, 204, and 206 during processing of instructions. Bus 214 provides CPUs 202, 204, and 206 a connection to system logic 216, which is used to provide a means to put a CPU in a "stop-state". In this way, system logic 216 may isolate a deconfigured CPU from the rest of the functioning system. The service processor 218 is connected to the system via I/O 212 and has access to the system logic 216. Service procesor 218 includes firmware for gathering and analyzing status information from each CPU in system 200. Software routines are stored in read-only memory (ROM). Unlike random access memory (RAM), read-only memory stays intact even in the absence of electrical power. Startup routines and low-level input/output instructions are stored in firmware. Nonvolatile random access memory (NVRAM) 220 is a nonvolatile memory device containing system information. In addition, a deconfiguration area 222 is included in NVRAM 220 to store pertinent status information and configuration states of CPUs 202, 204, and 206 received from the runtime system firmware or the service processor 218. This status information includes indications of soft errors occurring in CPUs 202, 204, and 206.

System 200 also includes runtime system firmware 224. This firmware is also,referred to as Run-Time Abstraction Service (RTAS) and provides an abstracted interface between the operating system 226 and the system hardware. Firmware 224 provides a set of hardware specific software functions which an operating system can call to perform a system hardware specific task. This firmware insulates the operating system from writing hardware unique code for the same task. In the depicted examples, operating system 226 is an Advanced Interactive Executive (AIX) operating system, which is also available from IBM.

When an error occurs, an error flag may be set within an error register, and the error processing facilities in the system detect the setting of the error flag. The runtime system firmware 224, with the assistance from the service processor 218 as required (system implementation specific), analyzes and isolates the error to a specific CPU and report the error to the operating system.

With reference now to FIG. 3A, a diagram depicts a standard error condition register that may be found within a processor. Error condition register 300 is similar to error register 202a, 204a or 206a found in FIG. 2. Error condition register 300, is comprised of error condition bits 302–316. Each error bit represents a flag for the occurrence of a specific type of error condition within a processor. For example, an L2 cache error may be represented by setting bit 0 of error condition register 300. The occurrence of an arithmetic overflow may be indicated by setting bit 1 of error condition register 300. After the error condition is detected and appropriately processed, the runtime system firmware or the service processor (system implementation specific) will clear the error condition bit in order to provide the ability to detect the occurrence of another error condition.

With reference now to FIG. 3B, a standard error condition mask register within a processor is depicted. Error condition mask register, 350 may be similar to error mask register 202c, 204c or 206c shown in FIG. 2. Error condition mask register 350 consists of error condition flags 352–366. Each error condition mask bit may be set to mask the indication of a specific error condition within error condition register 300. Each error condition mask bit is associated with a corresponding error condition as described above with respect to error condition register 300. For example, the occurrence of an L2 cache error may be masked by setting bit 0 of error condition mask register 350. The occurrence of an arithmetic overflow may be masked by setting bit 1 of error condition mask register 350. When an error condition mask bit is set and the corresponding error condition occurs, the system does not set the corresponding error condition bit to provide an external indication of the occurrence of the error, thereby masking the occurrence of the error condition from detection via the error condition register. The number of error condition bits and error condition mask bits and their content or interpretation may vary depending upon system implementation.

With reference now to FIG. 3C, a flowchart of a process for runtime deconfiguration of a processor in a multiprocessor system is depicted. The process illustrated in FIG. 3C may, be implemented using runtime system firmware 224, service processor 218, system logic 216, and operating system 226 in FIG. 2 in these examples.

The process begins by identifying a predictive error (step 390). A runtime error-tracking firmware routine periodically checks, tracks, and maintains a record of the recoverable errors, which are localized within a processor. This firmware may be implemented using, for example, runtime system firmware 224 or a service processor 218 in FIG. 2. The exact location will depend on a specific system hardware implementation. The firmware utilizes the error detection and capture hardware circuitry within a CPU. When the error record indicates a pattern of soft errors which are trending toward a hard error, the firmware marks the error record of this CPU in deconfiguration area 222 of NVRAM 220 to indicate that this CPU should not be used in the future. Then, this error, a predictive error type, is reported to the operating system with the associated CPU ID.

The operating system then initiates a process to stop the CPU (step 392). When the operating system receives the error log, the operating system will migrate all processes and interrupt handlers off of the CPU identified as having the predictive error. These processes and interrupt handlers are migrated to other CPUs in the system. The operating system will then stop dispatched tasks and interprocessor interrupts to the CPU with the error.

Then, the operating system will send a call to "stop-self" firmware portion of the runtime system firmware to stop the CPU. The "stop-self" firmware, which is part of runtime system firmware 224, is running in the CPU to be deconfigured. Depending on the specific system hardware implementation, the "stop-self" firmware can put the CPU in "stop-state" by itself, or it may need assistance from the service processor.

Next, the system is informed of the transition (step 394). The stop-self firmware portion of the runtime system firmware informs other parts of the this system firmware and service processor that the system is transitioning from N processors to N-1 processors. The runtime system firmware and the service processor change their state machines to manage and/or handle the system with N-1 processors. The stop-self firmware, then flushes the local caches (L1 and L2) of the processor with "predictive error" to ensure that all memory data that are stored in and modified by this processor are stored back into memory. The stop-self firmware, with assistance from the service processor as required, places the processor in "stop state" (step 396)(or a hard reset in some hardware implementations). Once this process is completed, the system continues to run with N-1 processors.

Thereafter, if the system is shutdown and rebooted, the CPU with the predictive error is removed from the system configuration during the next system boot process. The information used to remove the CPU is stored in a nonvolatile memory, such as NVRAM 220 in FIG. 2. This state of the processor is maintained within deconfiguration area 222 in NVRAM 220 in FIG. 2. More information on boot-time deconfiguration of a processor is found in United States Patent Application, entitled "Method and System for Boot-Time Deconfiguration of a Processor in a Symmetrical Multi-Processing System," attorney docket AT9-98-320, Ser. No. 09/165,952, filed Oct. 2, 1998. More information on runtime deconfiguration of a processor is found in United States Patent Application, entitled "Method and Apparatus for Run-Time Deconfiguration of a Processor in a Symmetrical Multi-Processing System," attorney docket AT9-99-537, Ser. No, 09/434,767, filed on Nov. 4, 1999.

With reference now to FIG. 4, a block diagram depicts some of the software modules involved in performing a processor deconfiguration through a simulated error condition in accordance with a preferred embodiment of the present invention. Operating system 400 along with the runtime system firmware 403 provide various runtime services within a data processing system, such as data processing system 200 in FIG. 2. Operating system 400 accepts processor deconfiguration request 402 through command line processing module 404. Although a user may enter the processor deconfiguration request via a command line interface, the user may also enter the request through a graphical user interface or via a variety of other means, such as a batch job, a test utility, etc.

The user may have a variety of purposes for requesting a processor deconfiguration, such as testing execution flow or execution path of the error handling modules of the multiprocessing system, or more simply, the error-path processing of the multiprocessing system. The user may also want to test a new software application to verify that the software can run reliably with processor deconfiguration functions. With a user-initiated error injection provided by the present invention, a user, such as a service engineer or test engineer, may enter multiple processor deconfiguration requests in rapid succession in order to test the multiprocessing system's fault-tolerant capabilities or the application software robustness. Each processor deconfiguration request may have associated request parameters that may depend upon the functionality that is being tested in the error-path testing environment. For example, the processor deconfiguration request may have an associated CPU ID, type of error condition, or other parameters that direct the operating system and the runtime error inject module 406 to simulate the processor error condition in a variety of manners.

After the command line processing module has accepted the processor deconfiguration request, command line processing module 404 parses and interprets the request. The operating system 400 then dispatches a software process to the CPU ID that was specified by the deconfiguration request. This software process then invokes the runtime error inject module 406 with the error type and other parameters from the deconfiguration request. The runtime error inject firmware 406 then simulates the processor hardware error by setting an appropriate error bit in error condition register 300. Thereafter, hardware error processing module 410 is invoked to handle the indicated error condition detected by the multiprocessing system 200. At that point, hardware error processing module 410 would not be aware that the detected error condition was from either an actual hardware malfunction or a software simulated error condition. Since hardware error processing module 410 relies on the reading of an error condition register, hardware error processing module 410 does not know the manner in which an error condition bit has been set within the error condition-register. The multiprocessing system 200 then reacts in a manner appropriate for the detected hardware error condition by invoking the proper error-path for processing the error condition via service processor 405. In this manner, the user injects simulated hardware errors via software to test the error paths of the multiprocessing system 200.

When a system experiences a failure, the failure may be from a so-called hard or solid error from which no recovery is possible. A hard error in a system, in general, causes a system failure. Thereafter, the device that has caused the hard error is replaced. On the other hand, a number of failures are repeatable, or so-called soft errors, which occur intermittently and randomly. In contrast to a hard error, execution sustaining a soft error, with proper recovery land retry design, can be recovered and prevent the multiprocessor system from failing. Often, these soft errors are localized to a particular processor within the system. By detecting the error and recovering from the error by deconfiguring a processor, the multiprocessing system saves the execution state of the system and prevents a system failure. The hardware, operating system and system firmware can be thoroughly tested through the injection of a variety of errors to ensure that a processor is properly deconfigured in response to certain recoverable errors.

With reference now to FIG. 5, a flowchart depicts a process for testing deconfiguration of a processor in a multiprocessor system through a simulated error condition in accordance with a preferred embodiment of the present invention. The process begins when a user enters a command for a simulated error condition that would invoke an error path that deconfigures a processor (step 501). The operating system receives the request (step 502) and pass the request to the appropriate module to handle the requested simulated error condition (step 503). The appropriate module then invokes runtime error inject module 406 that injects a simulated error condition into the internal components of the processor through an appropriate instruction execution sequence (step 504).

In a preferred embodiment, the software error injection code in the runtime error inject module then sets the appropriate error bit in an error condition register (step 505). The error bit that should be set within the error condition register depends upon the error condition that one desires to simulate. The particular bit in the error condition register may be set through the execution of an appropriate instruction. An instruction of this type may be restricted in a such a manner that it can only be executed while the processor is in a restricted mode of operation, such as a supervisor mode.

The error condition is then detected (step 506), and since the error processing code is not aware of the cause or generation of the identified error condition, the operating system then invokes the appropriate error path in response to the detection of the error condition (step 507). The process is then complete with respect to the operating system injecting a simulated error condition and processing the error condition as if the error condition were caused by a hardware malfunction.

The advantages provided by the present invention should be apparent in view of the detailed description of the invention provided above Using the present invention to simulate an error condition, one does not need to physically modify the processor or the hardware to inject the processor error. One or more processors can be deallocated in this manner, which would allow testing of different system configurations, i.e. one-way, two-way, . . . n-way. All of the error-paths associated with such error conditions may then be tested in a complete manner facilitated by the ease and availability of the present invention through an operating system command interface. A better product may be designed that handles hardware errors in a more robust manner such that diagnostic procedures cost less and incur fewer maintenance problems.

It is important to note that while the present invention has been described in the context of a fully functioning data processing system, those of ordinary skill in the art will appreciate that the processes of the present invention are capable of being distributed in the form of a computer readable medium of instructions, including firmware, and a variety of forms and that the present invention applies equally regardless of the particular type of signal bearing media actually used to carry out the distribution. Examples of computer readable media include ROM chips or writable-type media such a floppy disc, a hard disk drive, a RAM, and CD-ROMs as well as transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for simulating an error condition in a multiprocessor data processing system having a plurality of processors, the method comprising the steps of:

requesting a simulated error condition for a specified processor of the plurality of processors; and in response to the requested simulated error condition, injecting an error condition into the specified processor of the multiprocessor data processing system by instruction execution.

2. The method of claim 1 further comprising:

detecting the error condition in the processor.

3. The method of claim 2 further comprising:

invoking error-path processing in response to the detected error condition.

4. The method of claim 3 further comprising:

deconfiguring the processor in response to the error-path processing.

5. The method of claim 1 further comprising:

executing an instruction to set an error condition bit in an error condition register.

6. The method of claim 5 further comprising:

detecting the error condition in the processor by monitoring an error condition register for active error condition bits.

7. The method of claim 6 further comprising:

deconfiguring the processor in response to the detected error condition.

8. The method of claim 1 wherein the requested simulated error condition indicates a selected processor within the multiprocessor data processing system in which the simulated error condition is to occur.

9. The method of claim 1 wherein the requested simulated error condition indicates a type of error condition to be injected.

10. An apparatus for simulating an error condition in a multiprocessor data processing system having a plurality of processors, the apparatus comprising:

requesting means for requesting a simulated error condition for a specified processor of the plurality of processors; and injecting means for injecting, in response to the requested simulated error condition, an error condition into the specified processor of the multiprocessor data processing system by instruction execution.

11. The apparatus of claim 10 further comprising:

first detecting means for detecting the error condition in the processor.

12. The apparatus of claim 11 further comprising:

invoking means for invoking error-path processing in response to the detected error condition.

13. The apparatus of claim 12 further comprising:

first deconfiguring means for deconfiguring the processor in response to the error-path processing.

14. The apparatus of claim 10 further comprising:

executing means for executing an instruction to set an error condition bit in an error condition register.

15. The apparatus of claim 14 further comprising:

second detecting means for detecting the error condition in the processor by monitoring an error condition register for active error condition bits.

16. The apparatus of claim 15 further comprising:

second deconfiguring means for deconfiguring the processor in response to the detected error condition.

17. The apparatus of claim 10 wherein the requested simulated error condition indicates a selected processor within the multiprocessor data processing system in which the simulated error condition is to occur.

18. The apparatus of claim 10 wherein the requested simulated error condition indicates a type of error condition to be injected.

19. A computer program product in a computer-readable medium for use in a multiprocessor data processing system having a plurality of processors for simulating an error condition, the computer program product:

instructions for requesting a simulated error condition for a specified processor of the plurality of processors; and instruction for injecting, in response to the requested simulated error condition, an error condition into the specified processor of the multiprocessor data processing system by instruction execution.

20. The computer program product of claim 19 further comprising:

instructions for detecting the error condition in the processor.

21. The computer program product of claim 20 further comprising:

instructions for invoking error-path processing in response to the detected error condition.

22. The computer program product of claim 21 further comprising:

instructions for deconfiguring the processor in response to the error-path processing.

* * * * *